United States Patent
Davis et al.

(10) Patent No.: US 6,863,876 B2
(45) Date of Patent: Mar. 8, 2005

(54) MANGANESE DIOXIDE FOR ALKALINE CELLS

(75) Inventors: Stuart M. Davis, Norfolk, MA (US); William L. Bowden, Nashua, NH (US); Peter R. Moses, Windham, NH (US); Thomas C. Richards, Harvard, MA (US)

(73) Assignee: The Gillette Company, Boston, MA (US)

(*) Notice: Subject to any disclaimer, the term of this patent is extended or adjusted under 35 U.S.C. 154(b) by 0 days.

(21) Appl. No.: 10/094,199

(22) Filed: Mar. 8, 2002

(65) Prior Publication Data

US 2003/0170170 A1 Sep. 11, 2003

(51) Int. Cl.$^7$ .......................... C01G 45/02; H01M 4/50
(52) U.S. Cl. ...................... 423/605; 429/224
(58) Field of Search ................... 423/605; 429/224

(56) References Cited

U.S. PATENT DOCUMENTS

| | | | |
|---|---|---|---|
| 5,348,726 A | 9/1994 | Wang | 423/605 |
| 5,516,604 A | 5/1996 | Mieczkowska | 429/224 |
| 5,746,902 A | 5/1998 | Takehara | 205/57 |
| 6,585,881 B2 * | 7/2003 | Davis et al. | 205/539 |

FOREIGN PATENT DOCUMENTS

DE 3337568 4/1985

OTHER PUBLICATIONS

M. Mauthoor, A.W. Bryson, and F.K. Crundwell, Progress in Batteries & Battery Materials, vol. 16 (1997). pp. 105–109.
V.K. Nartey, L. Binder, and A. Huber, Journal of Power Sources, vol. 87 (2000), pp. 205–211.
L. Binder, W. Jantscher, F. Hofer, G. Kothleitner, Journal of Power Spurces, vol. 70 (1998), pp. 1–7.
R. Williams, R. Fredlein, et. al. Progress in Battery & Battery Materials, vol. 13 (1994), pp. 102–112.

* cited by examiner

*Primary Examiner*—Stanley S. Silverman
*Assistant Examiner*—Jonas N. Strickland
(74) *Attorney, Agent, or Firm*—Barry D. Josephs; Thomas G. Krivulka

(57) ABSTRACT

Particulate $MnO_2$, having simultaneously a micropore surface area greater than 8.0 m$^2$/g, desirably between about 8.0 and 13 m$^2$/g and BET surface area of between about 20 and 31 m$^2$/g within the context of an $MnO_2$ having a total intraparticle porosity of between about 0.035 cm$^3$/g and 0.06 cm$^3$/g produces enhanced performance when employed as cathode active material in an electrochemical cell, particularly an alkaline cell. The average pore radius of the meso and macro pores within the $MnO_2$ (meso-macro pore radius) is desirably greater than 32 Angstrom.

12 Claims, 4 Drawing Sheets

MANGANESE DIOXIDE FOR ALKALINE CELLS

The invention relates to an improved more active form of manganese dioxide for use as a cathode active material in electrochemical cells, particularly alkaline cells.

BACKGROUND

Manganese dioxide is commonly employed as a cathode active material in commercial batteries including heavy duty, alkaline and lithium cells. Battery grade manganese dioxide has been derived from naturally occurring manganese dioxide (NMD) and synthetically produced manganese dioxide. Synthetic manganese dioxide is basically divided into two categories: electrolytic manganese dioxide (EMD) and chemical manganese dioxide (CMD). NMD because of its high impurity content cannot be employed in alkaline or lithium cells.

EMD (electrolytic manganese dioxide) has become the preferred form of manganese dioxide for use in Zinc/$MnO_2$ alkaline or lithium cells. EMD (electrolytic manganese dioxide) can be manufactured from the direct electrolysis of an aqueous bath of manganese sulfate and sulfuric acid. The EMD is a high purity, high density, gamma manganese dioxide, desirable as a cathode material for electrochemical cells particularly Zn/$MnO_2$ alkaline cells, Zn-carbon and lithium/$MnO_2$ cells. During the electrolysis process the gamma EMD is deposited directly on the anode immersed in the electrolysis bath. The anode is typically made of titanium, lead, lead alloy, or graphite. The EMD is removed from the anode, crushed, ground, washed in water, neutralized by washing with dilute NaOH, $Na_2CO_3$, $NH_4OH$ or LiOH, and dried in a rotary dryer. The EMD product can then be used as cathode active material in an alkaline cell, typically a zinc/$MnO_2$ alkaline cell. The EMD product is generally heat treated to remove residual water before it can be used in a lithium cell. Conventional electrolysis processes for the manufacture of EMD and a description of its properties appear in Batteries, edited by Karl V. Kordesch, Marcel Dekker, Inc. New York, Vol. 1(1974), p.433–488. Conventional electrolysis processes for production of $MnO_2$ are normally carried out at temperature between about 80 and 98° C.

M. Mauthoor, A. W. Bryson, and F. K. Crudwell, *Progress in Batteries & Battery Materials*, Vol. 16 (1997), pp. 105–110 discloses an electrolysis method for manufacture of manganese dioxide (EMD). The electrolysis is performed at temperatures between 90 and 108° C. Although Mauthoor reports that discharge capacities of $MnO_2$ synthesized by electrolysis of an aqueous bath of $MnSO_4$ and $H_2SO_4$ at between 95° C. to 108° C. was about 9% higher than that for $MnO_2$ material produced at 95° C., there was no substantial difference among the three $MnO_2$ products produced at electrolysis temperatures of 100° C., 105° C., and 108° C. In fact, as Mauthoor increased the electrolysis temperature from 105 to 108° C., the percent $MnO_2$ in the electrolysis product and the discharge capacity of the $MnO_2$ product both decreased slightly. Thus, electrolysis at temperatures higher than 108° C. were not attempted or contemplated.

M. Ghaemi, Z. Biglari, and L. Binder, *Journal of Power Sources*, Vol. 102 (2001), pp. 29–34 discloses effects of varying temperature of the electrolysis bath during manufacture of the manganese dioxide (EMD). Specifically the properties of the EMD product were investigated when the EMD was employed in a rechargeable alkaline cell. The electrolysis bath temperatures were varied in a range between 60° C. and 120° C. The data is oriented towards the performance of the rechargeable cell with no data specifically dealing with performance of the EMD in a primary cell. Also, when the rechargeabe cells were tested the first cycle performance data did not show any improvement with cathodes of EMD produced under the higher electrolysis bath temperatures, e.g. 115–120° C. compared to conventional bath temperatures, e.g. 80–98° C.

In commercial EMD production, the electrolysis is normally carried out at temperatures between 94° C. and 97° C. and at current densities between 2 and 10 Amp/$ft^2$, more typically between 4 and 10 Amp/$ft^2$ of anode surface area. A titanium anode and graphite or copper cathode are typically employed. Increasing current density tends to increase the $MnO_2$ specific surface area (SSA). When electrolysis is carried out at conventional temperatures and current density is increased beyond the normal bounds, there is a tendency for the specific surface area (SSA) of the $MnO_2$ product to increase to a level which is outside (greater than) the desired range of between 18–45 $m^2$/g. Thus, at conventional temperatures it is very difficult to increase the current density and the deposition rate above a level of between about 10 to 11 Amp/$ft^2$ (108 to 119 Amp/$M^2$) without adversely affecting the quality of the product.

In addition, under conventional conditions of temperature and electrolyte composition, at current densities greater than 10 Amp/$ft^2$ (108 Amp/$m^2$ there is a tendency for passivation of the titanium anode to occur after a period of time, which may be shorter than the normal plating cycle of 1.5 to 3 weeks. The higher the current density, e.g. 12 Amp/$ft^2$ (130 Amp/$m^2$) rather than 10 Amp/$ft^2$ (108 Amp/$m^2$), the sooner such passivation is likely to occur. Passivation involves the formation of an insulating oxide film on the surface of the titanium, resulting in an increase in the operating Voltage of the anode. Once started the problem is self accelerating and soon results in a precipitous Voltage rise which exceeds the capability of the power supply followed by a loss of current, ending in complete and irreversible shut-down of the plating process. Often a number of anodes will fail simultaneously due to passivation. When this occurs, the anodes must be withdrawn, deposited EMD removed and the anodes must be surface treated to remove the tenacious oxide film prior to being returned to service. This is a highly disruptive and expensive problem. In a commercial setting, great care is taken to avoid anode passivation and a margin of safety is preserved in setting the current density below that which borders on passivation, EMD quality considerations aside.

V. K. Nartey, L. Binder, and A. Huber, *Journal of Power Sources*, Vol. 87 (2000), p. 205–211 describes an electrolysis process for making $MnO_2$ wherein the electrolysis bath was doped with $TiOSO_4$. The $MnO_2$ was used in an alkaline rechargeable battery. The reference states at page 210, col. 1 that the $MnO_2$ with $TiOSO_4$ doping (called $M_2$, Table 7) performed poorly on the initial discharge cycle (i.e. similar to a primary, non-rechargeable cell) despite a high specific surface area. When the bath was doped with $TiO_2$ the $MnO_2$ product (called $M_1$, Table 7) performed better on the initial discharge cycle, but still did not perform as well as the control $MnO_2$ (commercial grade EMD Tosoh GH-S). The electrolysis bath for the experiments described in Huber, et al. was maintained at conventional temperature of 98° C. and was performed at conventional current density of 6 milliAmp/$cm^2$ (5.57 Amp/$ft^2$) based on anode surface area.

Conventional battery grade manganese dioxide does not have a true stoichiometric formula $MnO_2$, but is better represented by the formula $MnO_x$, wherein x is typically between about 1.92 to 1.96, corresponding to a manganese valence of between about 3.84 and 3.92. Conventional EMD may typically have a value for x of about 1.95 or 1.96, corresponding to a manganese valence of 3.90 and 3.92, respectively. In addition to manganese (Mn) and oxygen (O), conventional electrolytic manganese dioxide (EMD) also contains a certain quantity of $SO_4^=$ ions and of $H^+$ ions (protons) in the crystal lattice. When heated to temperatures above 110 deg. C., the lattice protons combine with oxygen and are liberated as $H_2O$. Conventional EMD also has a real density of between about 4.4 and 4.6 g/cm$^3$.

CMD has for many years been economically produced commercially, but such commercial chemical processes while yielding high purity $MnO_2$, do not yield densities of $MnO_2$ comparable to that of EMD. As a result EMD has become the most widely used form of battery grade $MnO_2$, particularly for alkaline and lithium cells, since in such application it has become most desirable to employ high density $MnO_2$ to increase the capacity of these cells. However, in the course of conventional manufacture of EMD, it has been difficult to significantly alter important properties, such as surface area and activity, without adversely affecting the density.

U.S. Pat. No. 2,956,860 (Welsh) discloses a chemical process for the manufacture of battery grade $MnO_2$ by employing the reaction mixture of $MnSO_4$ and an alkali metal chlorate, preferably $NaClO_3$. This process is known in the art as the "Sedema process" for manufacture of chemical manganese dioxide (CMD). The reaction is carried out in the presence of solid $MnO_2$ particles which act as a catalyst and nucleation site for deposition of the $MnO_2$ formed from the reaction of $MnSO_4$ and alkali metal chlorate. As the reaction proceeds, $MnO_2$ which is formed precipitates onto, and even into, the $MnO_2$ substrate particles. The resulting $MnO_2$ product from the Sedema process takes the form of smooth-surfaced spherical particles. However, the $MnO_2$ does not have a density as high as that obtained in EMD. Significantly higher densities of the $MnO_2$ product are not obtainable by controlling reaction rate with alkali metal chlorate. Also the $MnO_2$ produced from the process disclosed in this reference cannot be readily deposited on substrates other than manganese oxides. If an alternative substrate or no substrate is employed, the $MnO_2$ product precipitates out during formation as a light fluffy product which is unacceptable as battery grade $MnO_2$.

An article by K. Yamamura et. al.,("A New Chemical Manganese Dioxide for Dry Batteries," *Progress in Batteries & Battery Materials*, Vol. 10 (1991), p. 56–75) discloses another process for manufacturing gamma $MnO_2$. The process referenced as the "CELLMAX" (CMD-U) process involves special treatment of purified crystalline $MnSO_4$ to produce an electrochemically active high density gamma $MnO_2$. The product has a surface area and particle appearance similar to electrolytic manganese dioxide (EMD), but differs in its pore size, tap density and particle size distribution. The process consists of the steps of leaching manganese ore, crystallizing, adjusting the pH, compressing and grinding. In the process the manganese sulfate solution extracted from the manganese ore is purified, crystallized under optimum conditions and roasted at very high temperature. The product $Mn_3O_4$ is oxidized to $Mn_2O_3$ by oxygen at high temperature. The $Mn_2O_3$ is subjected to acid treatment to yield gamma $MnO_2$ which in turn is compressed to yield a higher density. Although a high density gamma $MnO_2$ product is reported, the process has the disadvantage of involving a number of reaction and processing steps which require careful control and would be expensive to implement.

There are increasing commercial demands to make primary alkaline cells better suited for high power application. Modern electronic devices such as cellular phones, digital cameras, toys, flash units, remote control toys, camcorders and high intensity lamps are examples of such high power applications. Such devices demand high power, for example, an AA cell may be required to deliver high power between about 0.5 and 2 Watt which corresponds to current drain rates between about 0.5 and 2 Amp, more usually between about 0.5 and 1.5 Amp. Thus, it is desirable to provide a way of reliably increasing the useful service life of conventional primary alkaline cells particularly for cells to be used in high power applications, without adversely affecting cell performance on medium or low power applications.

Accordingly it is desirable to produce an improved form of manganese dioxide which extends the useful service life of electrochemical cells, particularly alkaline cells intended for a range of normal service including high power applications.

DEFINITIONS

A manganese dioxide particle can be visualized as formed of agglomerates of $MnO_2$ crystallites. In the case of EMD the crystallites are gamma phase $MnO_2$ crystals. (Gamma phase $MnO_2$ crystal is believed to result from the intergrowth of two phases pyrolusite and ramsdellite.) The crystallites are distinct microstructures which agglomerate into $MnO_2$ particles. The crystallites are typically between about 50 and 200 Angstrom long. There is thus void volume (porosity) between the crystallites within each particle (intraparticle porosity) and between the $MnO_2$ particles themselves (interparticle porosity) The average particle size of the $MnO_2$ particles can be readily controlled by grinding. Battery grade $MnO_2$ is typically ground to a mean average particle size of between about 1 and 100 micron, desirably between about 10 and 50 micron, typically about 35 micron. It should be noted that the total surface area (BET surface, $m^2/g$) of conventional $MnO_2$ particles is typically over 99 percent internal. Therefore, grinding to different particle sizes normally has little effect on the BET surface, $m^2/g$.

The solid $MnO_2$ material is thus defined by the crystallites. Each $MnO_2$ particle occupies an overall volume which is defined by the outer boundary of the $MnO_2$ particle. The overall volume of a single $MnO_2$ particle is comprised of the volume of the $MnO_2$ crystallites within the particle and the intra particle porosity, that is, the volume of the pores between the individual crystallites. Each one of the crystallites is known to have very fine crystallographic tunnels therein (2–4 Angstrom width) which are considered as part of the crystalline structure and not part of the intra particle porosity. In addition there is pore volume between the $MnO_2$ particles. This is referred to as interparticle porosity.

The bulk density (apparent density) of an $MnO_2$ powder sample is defined as the weight of the sample divided by it total apparent volume. The apparent volume comprises the volume of crsytallites and volume of pores which includes the interparticle pores as well as the intraparticle pores. The tapped bulk (apparent) density is the measurement of apparent density wherein the $MnO_2$ powder is first placed in a graduated cylinder and tapped down a defined number of times. EMD powder for use as cathode active material typically has a tapped bulked density between about 2.2 and 2.6 gm/cm$^3$.

The intraparticle pores, that is, the pores within an individual $MnO_2$ particle, can be classified into three regimes, namely, micropores, mesopores and macropores. These latter terms are used herein shall be assumed to be open pores within each particle, that is, having some pathway accessible by nitrogen gas from within the pore out to the environment external to the particle. There can be a certain small percentage of void volume trapped as closed pores within each $MnO_2$ particle. Such closed pores cannot be measured by conventional methods and are generally assumed as part of the real volume of $MnO_2$ matter. Thus the term real volume of an $MnO_2$ sample or particle is the volume of the $MnO_2$ crystallites including the closed pores. The intraparticle pores (micro and meso-macro pores) or total intraprticle porosity as referenced herein shall be understood to refer to open pores within the $MnO_2$ particle reachable by nitrogen gas used in the various testing methods described herein, e.g. BET (Brunauer, Emmett, Teller), BJH (Barrett, Joyner, Halenda), and deBoer "t" methods.

The total intraparticle porosity, $cm^3/g$, as reported herein and as conventionally reported in the literature is defined as the total intraparticle pores (micropores, mesopores and macropores within the $MnO_2$ particles) divided by the weight of the $MnO_2$ sample.

The micropores as referenced herein are defined as intraparticle pores having a diameter of less than or equal to 20 Angstrom. Mesopores as referenced herein are defined as intraparticle pores having a diameter of between about 20 and 500 Angstrom. The macropores as referenced herein are defined as intraparticle pores having a diameter of above about 500 Angstrom. The term meso-macro pores as used herein and in the claims shall mean intraparticle pores which make up the total of mesopores and macropores in the $MnO_2$, wherein the pore diameter of the meso and macro pores (meso-macro pores) are greater than that of the micropores. Namely, the meso-macropores as defined herein are intraparticle pores having a diameter greater than 20 Angstrom and the micropores are intraparticle pores having a diameter less than or equal to 20 Angstrom. The micropore surface area and micropore volume can be measured from the deBoer "t" method as described, for example, in the book, "Adsorption by Powders and Porous Solids", F. Rouquerol, J. Rouquerol & K. Sing, Academic Press, 1999, ISBN 0-12-598920-2,pgs. 174–176 and 222–224 and in the "Quantachrome Manual for the Autosorb Multistation Gas Sorption System", Quantachrome Corp., Boynton Beach, Fla., pgs. II-13 to II-16. The total intra particle pore volume (micro, meso and macropores within the particles) can be measured by the Barrett, Joyner, Halenda desorption method (BJH desorption method. This method is described, for example, in the preceding reference, pgs. 199 and 444 and in the Quantachrome Manual for the Autosorb Multistation Gas Sorption System, Quantachrome Corp., Boynton Beach, Fla., pgs.II-10 to II-12. The BET surface area for the $MnO_2$ particles, $m^2/g$, can be obtained from the well known BET (Brunauer, Emmett and Teller) method carried out in accordance with ASTM Standard Test Method D4820-99.

The term BET surface area ($m^2/g$) as used herein shall mean the standard measurement of particulate surface area by gas (nitrogen and/or other gasses) porosimetry as is recognized in the art. The BET surface area measures the total surface area on the exterior surface of the $MnO_2$ particle and also that portion of surface area defined by the open pores within the particle available for gas adsorption and desorption when applied. BET surface area determinations as reported herein are carried out in accordance with ASTM Standard Test Method D4820-99. The $MnO_2$ powder can be outgassed under vacuum typically at a temperature of 150° C. for 7 hours, under vacuum, in an instrument such as Quantachrome Degasser manufactured by Quantachrome Co. The BET surface area can be determined from nitrogen gas adsorbate and use of a multi-point BET equation to calculate the BET surface using the software provided by the instrument manufacturer.

The true crystalline density of $MnO_2$, that is the density of a true EMD or CMD crystallites is about 4.9 $g/cm^3$. The term real density (or skeletal density) of an $MnO_2$ powder sample is the weight of the sample divided by the real volume (volume of the $MnO_2$ crystallites plus closed pores). The real density of CMD is typically between about 4.6 and 4.7 g/cm3. The real density of EMD is typically between about 4.4 and 4.6 g/cm3. The particle density of CMD is typically about 3.0 g/cm3 and the particle density of EMD as used in electrochemical cells is typically about 3.3 g/cm3. The average particle density is the weight of the sample divided by the particle real volume, that is, the volume of crystallites and total intraparticle pores (micro, meso and macropores) within the particles. That is, the particle density does not include the interparticle porosity (volume of pores between the particles).

Particulate EMD is presently commercially available with BET surface area of between 20 and 40 $m^2/g$ and micropore area between 0 and 7.3 $m^2/g$. The literature does not report EMD which simultaneously has greater than 8.0 $m^2/g$ of micropore area along with a BET surface area of less than 31 $m^2/g$, e.g. 20 to 31 $m^2/g$. This is irrespective of the total intra particle porosity (total pore volume per gram within the $MnO_2$ particle.) EMD typically has an intraparticle total pore volume of between 0.04 and 0.06 $cm^3/g$.

SUMMARY OF THE INVENTION

In a principal aspect of the invention it has been determined that particulate $MnO_2$, having simultaneously a micropore surface area greater than 8.0 $m^2/g$, desirably between about 8.0 and 13 $m^2/g$ and BET surface area of between about 20 and 31 $m^2/g$ within the context of an $MnO_2$ having a total intraparticle porosity of between about 0.035 $cm^3/g$ and 0.06 $cm^3/g$, desirably between about 0.035 $cm^3/g$ and 0.05 $cm^3/g$, will produce enhanced performance when employed as cathode active material in an electrochemical cell, particularly an alkaline cell. It has been determined when the $MnO_2$ has the above parameters simultaneously, the average radius of the meso-macropores within the $MnO_2$ particles will be desirably large, namely, greater than 32 Angstrom, from calculations based on cylindrical pore geometry. The term "average" as used herein unless otherwise defined shall be taken to be the arithmetic mean average. This is believed to facilitate excellent ionic conduction of water and electrolyte hydroxyl ($OH^-$) ions. The higher meso-macropore average radius together with the high micropore surface area helps to achieve the excellent performance of the $MnO_2$ of the invention as cathode active material in alkaline cells.

In a specific aspect the manganese dioxide simultaneously has a BET surface area between about 20 and 28 $m^2/g$ and a micropore area between 8 and 13 $m^2/g$, and an average meso-macropore radius greater than about 32 Angstrom, with the total porosity, based on pores within the manganese dioxide, being between about 0.035 $cm^3/g$ and 0.040 $cm^3/g$.

In another specific aspect the manganese dioxide simultaneously has a BET surface area between about 20 and 30 $m^2/g$ and a micropore area between 8 and 13 $m^2/g$, and an average meso-macropore radius greater than about 32 Angstrom, with the total porosity, based on pores within the manganese dioxide, being between about 0.040 $cm^3/g$ and 0.045 $cm^3/g$.

In another specific aspect the manganese dioxide simultaneously has BET surface area between about 20 and 31 m$^2$/g and a micropore area between 8 and 13 m$^2$/g, and an average meso-macropore radius greater than about 32 Angstrom, with the total porosity, based on pores within the manganese dioxide, being between about 0.045 cm$^3$/g and 0.050 cm$^3$/g.

The excellent battery performance utilizing MnO$_2$ cathode active material having simultaneously a micropore area greater than 8.0 m$^2$/g, desirably between about 8.0 and 13 m$^2$/g and BET surface area of between about 20 and 31 m$^2$/g may possibly be explained as follows with respect to an alkaline cell: The micropores (micropore surface area greater than 8.0 m$^2$/g) within the individual MnO$_2$ particles are responsible for or greatly facilitate attainment of high voltage, high rate and high capacity cell performance. This is due to the presence of a high level of surface water and bound protons (H$^+$ ions) within the micropores. The mesopores and macropores within the individual MnO$_2$ particles are theorized to be responsible for conduction of water and hydroxyl (OH$^-$) ions into and out of the MnO$_2$ particles and also for the conduction of these species across the total cathode thickness. (Typical cathode thickness in an AA cell is approximately 2.2 mm.) It is theorized that the average radius of the meso-macropores should be sufficiently large, desirably greater than 32 Angstrom, to enable the highest rate diffusion and electro-migration of water and hydroxyl (OH$^-$) through the cathode which in turn maintains a high rate of electrochemical reaction.

The MnO$_2$ of the invention can be made in the form of EMD (electrochemical manganese dioxide). It will be appreciated that once the BET surface area (BET method) and micropore surface area (measured by deBoer "t" method) and total intraparticle pore volume (measured by BJH desorption method) are determined, the average meso-macro pore radius can be estimated. The average meso-macro pore radius can be calculated assuming a model of cylindrical shaped pores. (A sample calculation for the average radius of the meso-macro pores is presented in the examples herein.)

Excellent discharge performance is achieved when the MnO$_2$ of the invention is utilized as cathode active material in electrochemical cells, particularly zinc/MnO2 alkaline cells under normal operating conditions. Enhanced performance can be achieved when the MnO$_2$ (EMD) of the invention as used in zinc/MnO$_2$ alkaline cells particularly under high power application, e.g. at current drains between about 0.5 and 1.5 Amp or power output of between about 0.5 and 1.5 Watt for a AA alkaline cell. For example, when the MnO$_2$ of the invention is utilized as cathode active material in a zinc/MnO$_2$ AA alkaline cell an excellent capacity of about 500 to 680 milliAmp-hours can be achieved at continuous 1 Amp current drain to a cut off voltage of 1.1 volt. When the EMD of the invention is utilized as cathode active material in a zinc/MnO$_2$ AA alkaline cell an excellent capacity of about 1200 to 1500 milliAmp-hours can be achieved at continuous 1 Amp current drain to a cut off voltage of 0.9 volt.

DETAILED DESCRIPTION

EXAMPLE 1

The following example illustrates a method of calculating the average meso-macro pore radius, R, within a sample of particulate manganese dioxide. It will be understood that all of the parameters referenced herein are with respect to properties within the manganese dioxide particles, that is, intra particle properties. There is no concern herein with interparticle properties, for example, void volumes between the particles (interparticle porosity).

It has been determined desirable to obtain particulate manganese dioxide, preferably, particulate electrolytic manganese dioxide (EMD) which has an average meso-macro pore radius greater than 32 Angstrom (32×10$^{-10}$ meter) in conjunction with particulate manganese dioxide having a total intra particle porosity of between about 0.035 and 0.06 cm$^3$/g. This is irrespective of the average particle size.

Since the average radius of the meso-macro pores within a sample of MnO$_2$ particles cannot be measured directly, a method is presented wherein the average meso-macro radius can be calculated from obtainable surface area, and pore volume measurements. Specifically in a given sample of particulate MnO$_2$, the meso-macro pore average radius can be calculated once the BET total surface area, cm$^2$/g; total intraparticle pore volume, cm$^3$/g; micropore surface area, cm$^2$/g; and micropore volume, cm$^3$/g are determined. The total surface area, cm$^2$/g can be determined by conventional BET (Brauner, Emmett, and Teller) methods as referenced herein. The total intraparticle pore volume, cm$^3$/g, can be determined from the BJH (Barrett, Joyner, and Halenda) cumulative desorption volume method. The micropore surface area, cm$^2$/g, can be determined from the deBoer "t" micropore area determination method. The micropore volume, cm$^3$/g, can be determined from the deBoer "t" micropore volume determination method.

The average meso-macro pore radius can then be calculated as follows:

Assume that all pores are in the shape of cylinders. This is a conventional simplifying assumption employed in calculations of this type. The average pore radius is therefore that radius which would give a total calculated pore volume of the meso-macro pores in agreement with experiment, if all the pores were cylinders having identical diameters.

Then, meso-macro pore area=$n(2\pi RL)$

Where:

n is the number of meso-macro pore cylinders in 1 gram of particulate MnO$_2$ sample;

R is the average radius of the meso-macro pore cylinders;

L is the average length of the meso-macro pore cylinders.

Assume a basis of 1 gram of MnO$_2$ sample. Then: Meso-macropore volume=total pore volume−micropore volume=$n(\pi R^2 L)$ Meso-macropore area=BET total surface area−micropore surface area=$n(2\pi RL)$ Dividing the two preceding equations:

Meso-macropore volume/meso-macropore area=$R/2$ Therefore, $$R = 2 \times \text{Meso-macropore volume/meso-macropore area}$$

$$R = 2 \times \frac{[\text{Total pore volume} - \text{micropore volume}]}{[\text{Total surface area} - \text{micropore surface area}]}$$

Thus, the average meso-macropore radius, R (expressed in cm), is calculable once the total pore volume, cm$^3$/g; micropore volume, cm$^3$/g; BET total surface area, cm$^2$/g; and micropore surface area, cm$^2$/g are determined. These four parameters are measurable by the above referenced BET (Brauner, Emmett, and Teller), BJH (Barrett, Joyner, and Halenda) and deBoer "t" methods as above discussed. (Note: 1 cm=10$^8$ Angstroms)

DISCUSSION OF THE FIGURES

Figure 1:
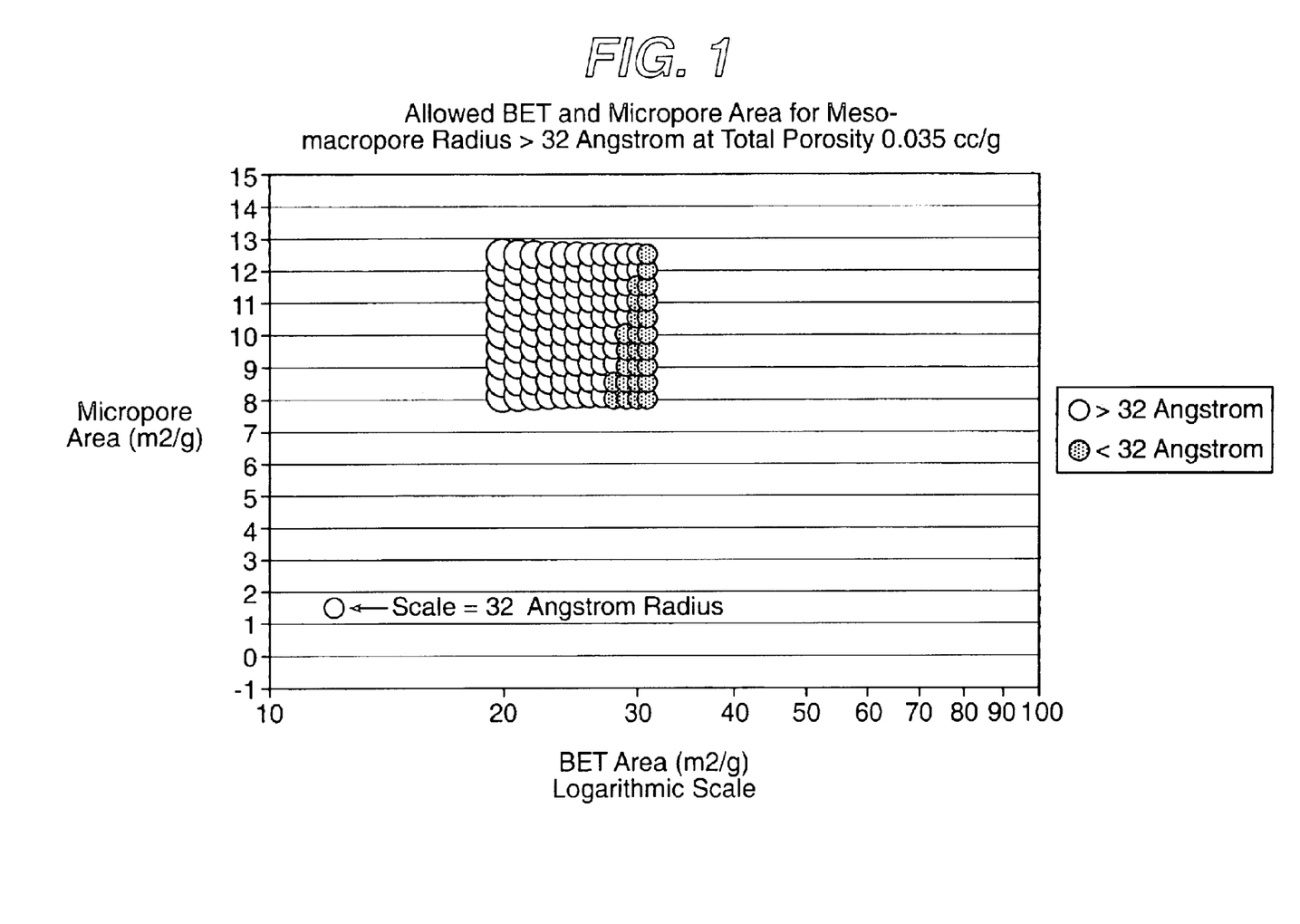
FIG. 1 is a plot of allowed BET total surface area and micropore surface area for particulate MnO$_2$ at total porosity of 0.035 cm$^3$/g.

FIG. 1 shows the range of micropore area and BET total surface area required simultaneously for particulate MnO$_2$ samples in order to obtain the desired average meso-macro pore radius greater than 32 Angstrom at total intraparticle porosity for the sample at 0.035 cm$^3$/g. The average meso-macro pore radius was calculated by the method set forth in Example 1. Implicit in this is a micropore volume cm$^3$/g, measured or calculated by the de Boer "t" method for nitrogen absorption/desorption. (As shown in Example 1 the micropore volume is one of the parameters needed, along with the total intraparticle pore volume, BET total surface area, and micropore area in order to calculate an average meso-macro pore radius.) It will be seen that from the deBoer treatment of nitrogen sorption data, micropore volume (cm3/g)=0.00050473×micropore area (m2/g).

FIG. 1 shows that at total intraparticle porosity of 0.035 cm$^3$/g, the micropore area should be in a range between about 8.0 and 13 m$^2$/g simultaneously with a BET total surface area of between about 20 and 28 m$^2$/g. The BET total surface is presented in logarithmic scale. The unfilled circles shown in FIG. 1 all have an average meso-macropore radius greater than 32 Angstrom. The largest unfilled circles shown in FIG. 1 have an average meso-macro pores radius much larger than 32 Angstrom. The circles are drawn to scale with the size circle representing a 32 Angstrom radius is shown in the lower left hand corner of the figure.

Figure 2:
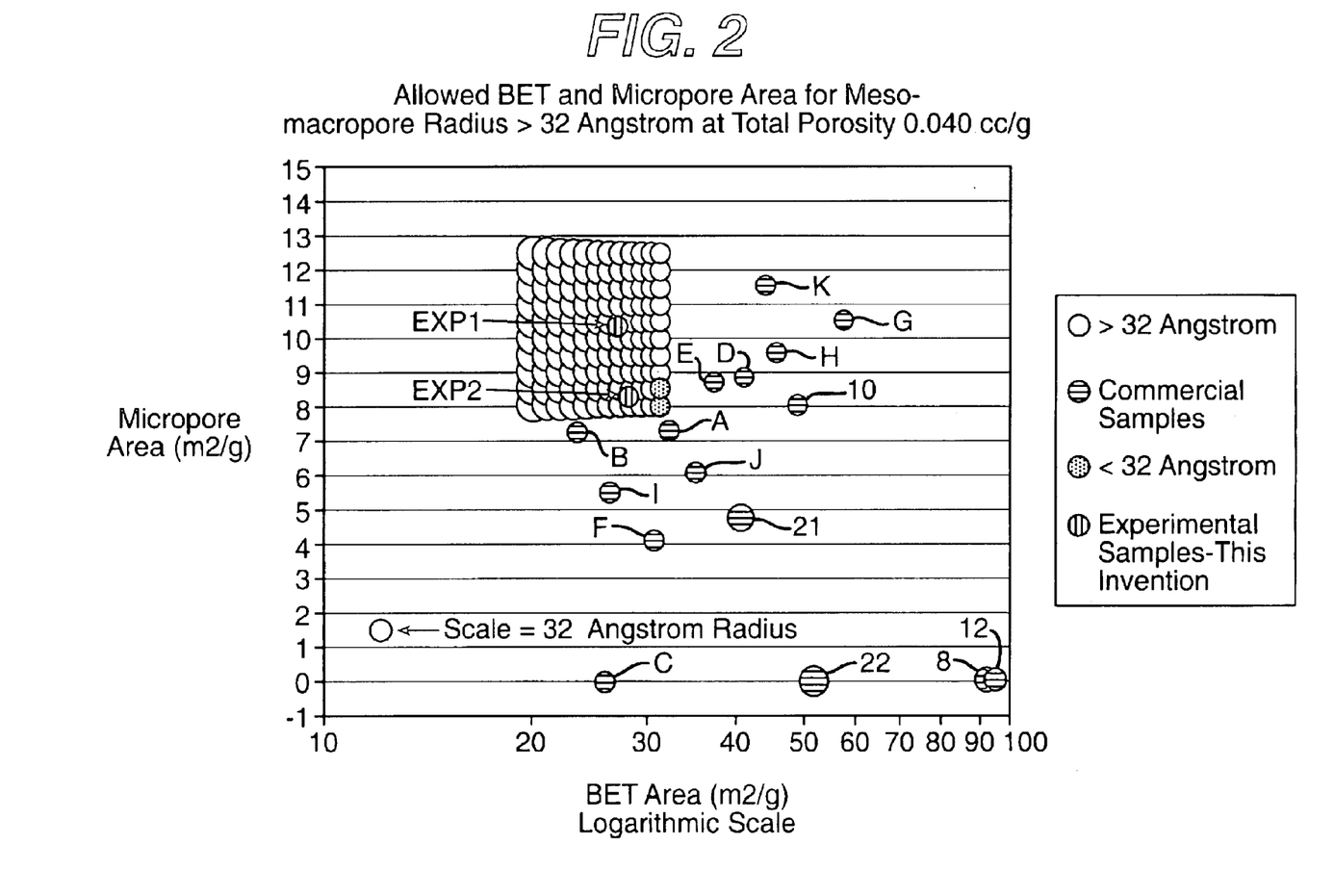
FIG. 2 is a plot of allowed BET total surface area and micropore surface area for particulate MnO$_2$ at total porosity of 0.040 cm$^3$/g.

FIG. 2 shows the range of micropore area and BET total surface area required simultaneously for particulate MnO$_2$ samples in order to obtain a desired average meso-macro pore radius greater than 32 Angstrom at total intraparticle porosity for the sample at 0.040 cm$^3$/g. The average meso-macro pore radius was calculated by the method set forth in Example 1.

FIG. 2 shows that at total intraparticle porosity of 0.040 cm$^3$/g, the micropore area should be in a range between about 8.0 and 13 m$^2$/g simultaneously with a BET total surface area of between about 20 and 31 m$^2$/g. (The unfilled circles shown in FIG. 2 all have an average meso-macropore radius greater than 32 Angstrom.)

Figure 3:
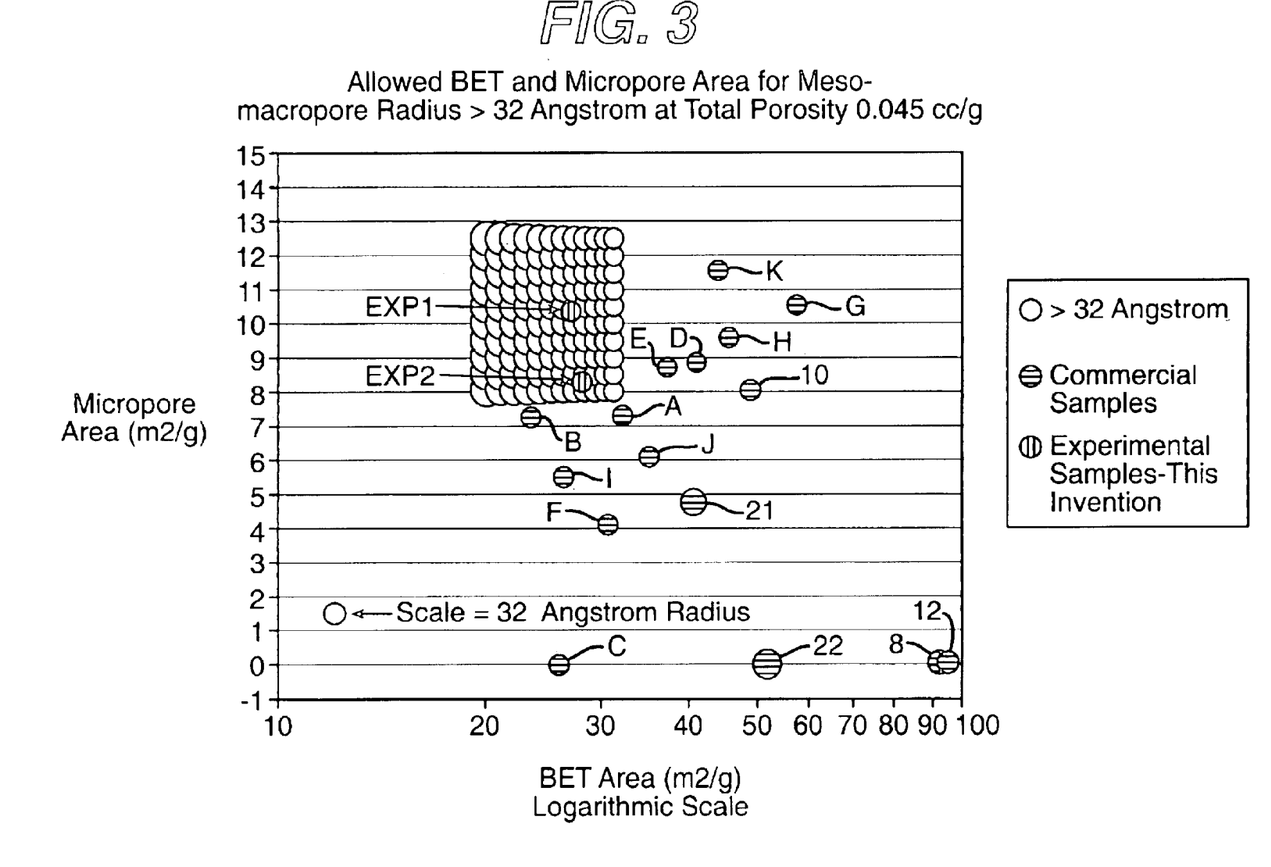
FIG. 3 is a plot of allowed BET total surface area and micropore surface area for particulate MnO$_2$ at total porosity of 0.045 cm$^3$/g.

FIG. 3 shows the range of micropore area and BET total surface area required simultaneously for particulate MnO$_2$ samples in order to obtain a desired average meso-macro pore radius greater than 32 Angstrom at total intraparticle porosity for the sample at 0.045 cm$^3$/g. The average meso-macro pore radius was calculated by the method set forth in Example 1.

FIG. 3 shows that at total intraparticle porosity of 0.045 cm$^3$/g, the micropore area should be in a range between about 8.0 and 13 m$^2$/g simultaneously with a BET total surface area of between about 20 and 31 m$^2$/g. (The unfilled circles shown in FIG. 3 all have an average meso-macropore radius greater than 32 Angstrom.)

Figure 4:
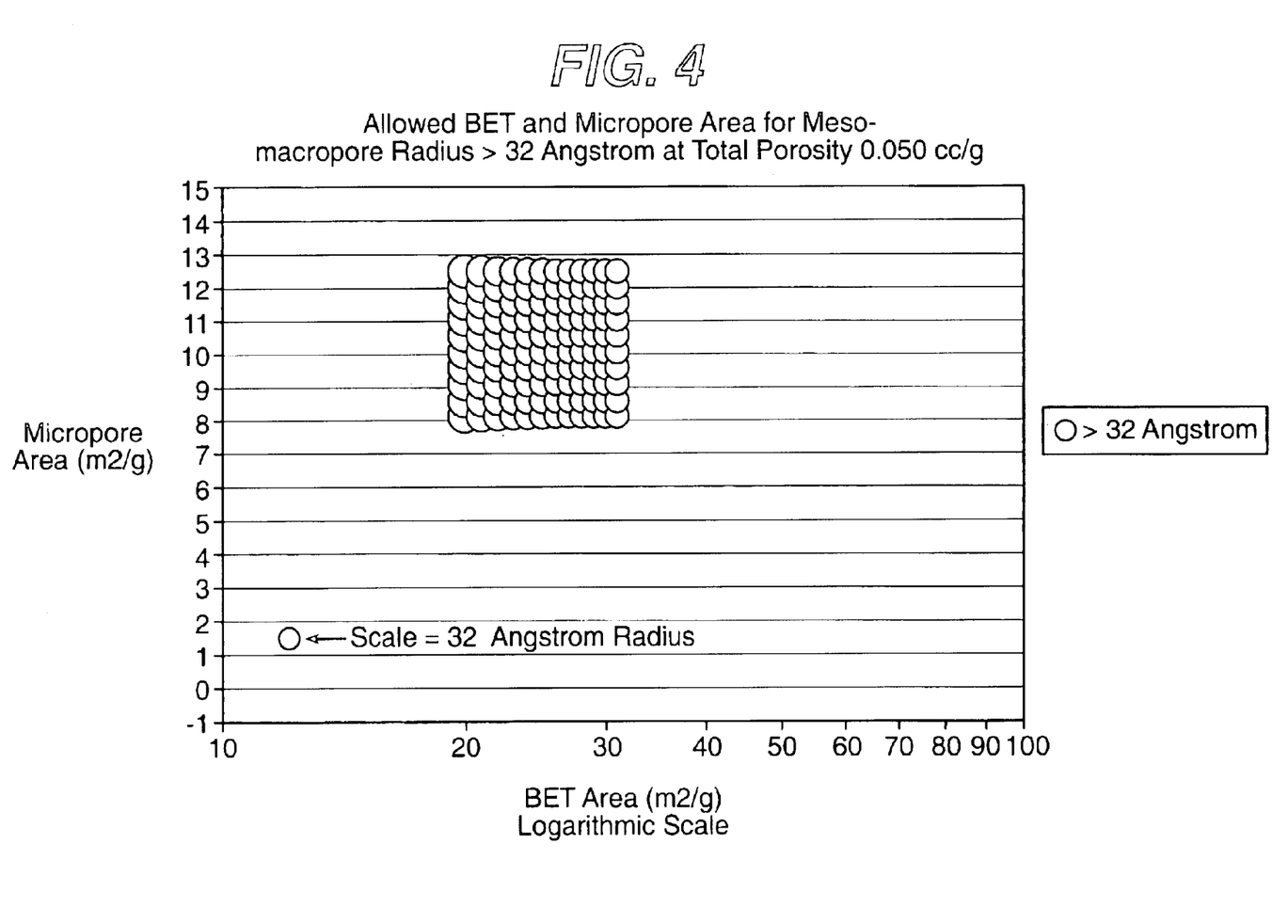
FIG. 4 is a plot of allowed BET total surface area and micropore surface area for particulate MnO$_2$ at total porosity of 0.050 cm$^3$/g.

FIG. 4 shows the range of micropore area and BET total surface area required simultaneously for particulate MnO$_2$ samples in order to obtain a desired average meso-macro pore radius greater than 32 Angstrom at total intraparticle porosity for the sample at 0.050 cm$^3$/g. The average meso-macro pore radius was calculated by the method set forth in Example 1.

FIG. 4 shows that at total intraparticle porosity of 0.050 cm$^3$/g, the micropore area should be in a range between about 8.0 and 13 m$^2$/g simultaneously with a BET total surface area of between about 20 and 31 m$^2$/g. (The unfilled circles shown in FIG. 4 all have an average meso-macropore radius greater than 32 Angstrom.)

In FIGS. 2 and 3, a number of commercial EMD materials and experimental samples (ER samples, according to this invention) are shown. Values of BET area, micropore area, intraparticle pore volume, micropore volume, and calculated meso-macropore radius for these materials are given in Table 1.

TABLE 1

Properties of Applicant's Experimental vs. Existing Commercial Battery Grade Manganese Dioxide[1]

| IC# or Other ID | Sample Name | BET Area (m2/g) | Micropore Area (m2/g) | Micropore Volume (cc/g) | Intra-particle Volume (cc/g) | Meso-macro Pore Radius (Angstrom) |
|---|---|---|---|---|---|---|
| EXP1 | EMD EXP1 | 26.74 | 10.355 | 0.005226 | 0.03716 | 38.98 |
| EXP2 | EMD EXP2 | 27.73 | 8.27 | 0.004174 | 0.038 | 34.76 |
| A | EMD KM Trona D | 31.98 | 7.25 | 0.003659 | 0.0413 | 30.44 |
| B | EMD KM HP | 23.31 | 7.22 | 0.003644 | 0.0343 | 38.11 |
| C | EMD Tosoh GHPT | 25.64 | 0 | 0 | 0.0423 | 33.00 |
| D | EMD Tosoh HHP | 40.87 | 8.83 | 0.004457 | 0.0516 | 29.43 |
| E | EMD Chemetals | 37.09 | 8.69 | 0.004386 | 0.0438 | 27.76 |
| F | EMD Mitsui | 30.37 | 4.063 | 0.002051 | 0.04528 | 32.87 |
| 10 | EMD KM Trona D 6321 | 48.87 | 8 | 0.004038 | 0.0791 | 36.73 |
| 8 | CMD Far M | 92.46 | 0 | 0 | 0.2023 | 43.76 |
| 22 | CMD Japan 3/84 | 51.7 | 0 | 0 | 0.1816 | 70.25 |
| G | EMD Delta TL C878/I42 | 57.08 | 10.52 | 0.00531 | 0.0699 | 27.74 |
| 21 | EMD | 40.41 | 4.71 | 0.002377 | 0.1127 | 61.81 |

TABLE 1-continued

Properties of Applicant's Experimental vs. Existing Commercial Battery Grade Manganese Dioxide[1]

| IC# or Other ID | | Sample Name | BET Area (m2/g) | Micropore Area (m2/g) | Micropore Volume (cc/g) | Intra-particle Volume (cc/g) | Meso-macro Pore Radius (Angstrom) |
|---|---|---|---|---|---|---|---|
| H | | EMD KM Low Na 9864 | 45.55 | 9.58 | 0.004835 | 0.0567 | 28.84 |
| | 12 | CMD Synth MnO2 MHV | 95.35 | 0 | 0 | 0.1764 | 37.00 |
| I | | EMD KM TronaD Feb 02 | 26.98 | 5.456 | 0.002754 | 0.03876 | 34.92 |
| J | | XiangtanA Feb 02 | 34.94 | 6.026 | 0.003042 | 0.04988 | 32.40 |
| K | | XiangtanB Feb 02 | 43.92 | 11.54 | 0.005825 | 0.04877 | 26.53 |
| | | | | | Avg → | 0.0750 | |
| | | | | | Median → | 0.0499 | |

Notes:
1. The experimental battery grade MnO$_2$ made by Applicant herein is reported as experimental samples EXP1 and EXP2. The various existing battery grade MnO$_2$ samples are indicated by letters A–I or by numbers. Those samples designated by number are reference materials, called "IC" samples" (International Common samples). The IC samples are drawn from various world suppliers of commercial EMD and CMD materials and have an IC sample number, assigned by the International Battery Association (IBA) Incorporated. The remainder are typical commercial CMD and EMD materials.

All of the commercial samples fall outside the range of BET area and micropore area claimed in this invention, that is none of the commercial materials possess simultaneously a BET area of 20-31 m2/g and a micropore area greater than 8.0 m2/g. Although the commercial materials exhibit a wide range of pore volumes from 0.034 cm3/g to 0.200 cm3/g, it doesn't matter on which plot they are displayed as this doesn't alter the BET or micropore values. For the sake of convenience we have shown these on the plots for intraparticle pore volumes of 0.040 and 0.045 cm3/g. The picture is unchanged for all other intraparticle pore volumes greater than 0.045 cm3/g since only open circles appear beyond this point in the field bounded by BET area from 20 to 31 m2/g and micropore area from 8.0 to 13.0 m2/g. The experimental samples of this invention EXP1 and EXP2 fall well within the range of this field, i.e. BET area of 20 to 31 m2/g and, simultaneously, micropore area greater than 8.0 m2/g:

| | BET Area (m$^2$/g) | Micropore Area (m$^2$/g) |
|---|---|---|
| EXP1 | 26.7 | 10.36 |
| EXP2 | 28.2 | 8.70 |

Even the acknowledged leading commercial EMD material for high power performance, Sample B=KMHP (Kerr McGee High Power EMD) falls outside of the region claimed; it has a micropore area less than 8.0 m2/g.

| | | |
|---|---|---|
| KMHP | 23.3 | 7.2 |

It might seem a simple matter to increase the micropore area of this sample somewhat, in order to move this material into the desired range. But the situation is quite the contrary. It is extremely difficult to find conditions for electrolytic deposition of EMD which can unilaterally adjust any one parameter, such as micropore area, without also affecting other key parameters such as BET area and total intraparticle porosity.

Thus, one could try to increase the current density in order to gain micropore area. But a well known consequence of increasing current density is to rapidly increase BET area. As BET area increases the calculated average meso-macropore radius will decrease until it falls below the limit of 32 Angstroms, required for good ionic and water transport in the MnO2 particle.

This is especially true for an MnO2 material having a low intraparticle volume such as KMHP EMD (sample B), i.e. intraparticle volume=0.0036 cc/g. In this case from FIG. 1 we see that for a micropore area around 7.2 m2/g the upper limit for BET area is less than 28 m2/g. Hence, the KM HP material is already close to the limit, and any attempt to increase micropore area by increasing current density runs the risk of exceeding the desired BET limit.

We have found that a preferred condition for depositing EMD having BET area of 20–31 m2/g and simultaneously having micropore area greater than 8.0 m2/g, along with a reasonable intraparticle porosity of 0.030 to 0.060 cm$^3$/g is to operate the deposition cell at temperatures>110 deg. C. and super atmospheric pressure, as described in our earlier patent application, Ser. No. 09/788,754, filed Feb. 20, 2001. This condition alone (Temperature>110 deg. C.) is not sufficient to guarantee obtaining material within the desired range of BET and micropore areas. In addition to temperature, the current density and electrolyte composition must be adjusted to their respective optima as well.

For example, to produce EMD sample EXP2, the following deposition conditions were employed:

| | |
|---|---|
| Temperature | 120.3 deg. C. |
| Pressure | 29.9 psig |
| MnSO4 concentration | 0.75 mole/liter |
| H2SO4 concentration | 1.04 mole/liter |
| Current density | 9.38 A/ft2 |
| Duration of plating | 165 hours |
| Anode | Titanium, commercial grade, sandblasted surface |
| Cathodes | Graphite |
| Weight of plated EMD | 1,575 grams |

The above conditions are not meant to be exclusive, nor is it claimed that they are completely optimal; only that they have been found to produce a material within the desired range of BET and micropore areas.

At the same nominal temperature of 120 deg. C., the average conditions in the cell for EXP1 were:

| | |
|---|---|
| Temperature | 120.0 deg. C. |
| Pressure | 15.0 psig |
| MnSO4 concentration | 0.88 mole/liter |
| H2SO4 concentration | 0.63 mole/liter |
| Current density | 6.19 A/ft2 |
| Duration of plating | 257 hours |
| Anode | Titanium, commercial grade, sandblasted surface |
| Cathodes | Graphite |
| Weight of plated EMD | 284 grams |
| Ti doping in the product | 2,160 ppm Ti |

It should be noted that while EXP2 was produced on large electrodes (83.25 in2)in an electrolyte bath of constant composition (continuously refreshed electrolyte), EXP1 was produced on smaller electrodes (14.88 in2)in a large volume (11 to 12 liters) of static electrolyte, hence with a variation in electrolyte composition of +/−15% compared to the average values quoted above. In this trial (EXP1), we also allowed the Ti anode to corrode, prior to initiating plating, which provided some doping of the bath and the final deposit with Titanium (i.e. 2,160 ppm of Ti in the final EMD powder).

In both of these trials, those familiar with the practice of commercial EMD plating will appreciate that acid levels were generally higher than that employed in commercial EMD plating baths. These rarely exceed 0.5 mole/liter of H2SO4, for fear of passivating the Ti anodes. No tendency towards passivation was seen during these trials. This is attributed to the very high plating temperature employed, around 120 deg. C., which is possible only in a pressurized cell. Ordinary commercial practice is to plate at temperatures of 94 to 97 deg. C., in an unpressurized cell at 0.3 to 0.5 mole/liter H2SO4. It is believed that high acid is one of the conditions (in addition to elevated temperature) which favors the production of high quality EMD as defined in this invention, i.e. with BET area in the range 20–31 m2/g and, simultaneously, micropore area greater than 8.0 m2/g.

The conditions mentioned above are not meant to limit this invention. Any temperature above 110 deg. C. is believed practical and the ideal range of temperature is believed to be above 120 C. up to the point where construction of pressurized cells becomes economically inefficient. For example up to 155 C. and up to 125 psig. The electrolysis, for example, can desirably be carried out at elevated temperatures between about 110° C. and 180° C., preferably between about 115° C. and 155° C., also advantageously between 120° C. and 155° C. and corresponding superatmospheric vapor-liquid equilibrium pressure, or even at somewhat higher pressures. The above desired properties of manganese dioxide having a BET surface of between about 20 and 31 $m^2/g$ and simultaneously a micropore area between about 8.0 and 13 m2/g within the context of a total porosity between about 0.035 and 0.06 $cm^3/g$ is more readily achievable at operation of the electrolysis at such elevated temperatures and superatmospheric pressure.

The superior performance of samples EXP1 and EXP2 is illustrated in the performance results summarized in Tables 2 and 3. Tables 2 and 3 present discharge data for practical AA alkaline zinc cells constructed with the EXP1 and EXP2 manganese dioxide materials compared to commercial EMD; either 100% Trona D EMD (Kerr McGee Corporation) or a 50/50 blend of Trona D EMD with KMHP EMD (Kerr McGee High Power EMD).

TABLE 2

Comparative Performance of EMD of Present Invention versus Commercial EMD Materials at 1 Ampere Continuous Discharge to Different End Point Voltages

| Cell Build | EMD Type (s) | A-hrs to 1.1 V | A-hrs to 1.0 V | A-hrs to 0.9 V | A-hrs to 0.8 V |
|---|---|---|---|---|---|
| GM 826–833 | 100% Trona D | 0.509 | 0.893 | 1.159 | 1.306 |
| GM 826–833 | EXP1 Present invention | 0.686 +34.8% | 1.031 +15.5% | 1.322 +14.1% | 1.508 +11.5% |
| G42 | 50/50 Trona D/ KMHP | 0.423 | 0.699 | 0.913 | 1.060 |
| G42 | EXP2 Present invention | 0.521 +23.2% | 0.813 +16.3% | 1.044 +14.4% | 1.211 +14.2% |

TABLE 3

Comparative Performance of EMD of Present Invention versus Commercial EMD Materials on the 1 Ampere 10 Second/Minute, 1 hour/12 Hour Simulated Photoflash Test to Different End Point Voltages

| Cell Build | EMD Type (s) | Pulses to 1.1 V | Pulses to 1.0 V | Pulses to 0.9 V | Pulses to 0.8 V |
|---|---|---|---|---|---|
| G42 | 50/50 Trona D/ KMHP | 221 | 375 | 570 | 651 |
| G42 | EXP2 This invention | 232 +5.0% | 385 +2.7% | 581 +1.9% | 665 +2.2% |

It is seen from Table 1 that the gains on the 1 Ampere continuous drain are very substantial. The difference in the absolute performance between builds GM 826–833 and G42 are attributed to the use of different lots of materials and components, different assembly tools and personnel and slight differences in the ambient temperature during discharge. (These two builds were made more than 1 year apart.) The comparisons between experimental EXP1 and EXP2 materials and control EMD, within a given build, show the clear superiority of the former.

It is seen from Table 2 that small, but significant improvements are also realized on the simulated photoflash test when EMD is prepared according to the teachings of the present invention, i.e. EXP2. No photoflash data was available for EXP1 due to a scarcity of cells, based on the small quantity of EMD produced on the 14.88 in2 electrodes, most of which was consumed in analyses and in the few cells discharged on the 1 Ampere continuous drain.

Conventional commercial electrolysis processes for preparation of electrolytic manganese dioxide (EMD)have generally been carried out under atmospheric conditions and temperatures below 98° C., more typically between 94° C. and 97° C. For production of CMD the temperatures have been somewhat lower, between about 85° C. and 95° C., carried out at atmospheric pressure. It will be observed from the data presented in the tables that manganese dioxide produced by such conventional processes do not have the combination of BET surface area and micropore area at total porosity between 0.035 $cm^3/g$ and 0.06 $cm^3/g$ which Applicant has determined can result in a manganese dioxide having a meso-macro pore average radius greater than 32 Angstrom. Specifically, an analysis of the data reported in the accompanying tables reveals that none of the prior art conventional battery grade manganese dioxide, whether produced by conventional electrolysis (EMD) or by conventional chemical processing (CMD), results in a manganese dioxide product having the combination of BET surface area between 20 and 31 m$^2$/g simultaneously with and micropore area between about 8 and 13 m$^2$/g, within the context of a total intraparticle porosity of between about 0.035 and 0.06 cm$^3$/g, more typically between about 0.035 and 0.05 cm$^3$/g.

It is thus believed that the prior art has failed to recognize that improved alkaline cell performance is attainable from manganese dioxide having the above combination of the BET surface between 20 and 31 g/m$^2$ and micropore surface between about 8.0 and 13 g/m$^2$ within the context of a total porosity between about 0.035 and 0.06 cm$^3$/g, more typically between about 0.035 and 0.05 cm$^3$/g.

Secondly, the prior art has not focused on changing the operating conditions of commercial electrolysis to significantly higher temperatures and pressures in order to produce electrolytic manganese dioxide (EMD) showing better performance in alkaline cells. This is also true of production of CMD by chemical processing. In particular, commercial producers of battery grade manganese dioxide may have been reluctant to operate electrolysis or chemical processes at elevated conditions of temperature and pressure, because of the concern of added expense. In contrast it is reported, for example, in commonly assigned application Ser. No. 09/788,754, filed Feb. 20, 2001 that operation of electrolysis for production of EMD at elevated temperatures between about 115° C. and 155° C. and superatmospheric vapor-liquid equilibrium, or near equilibrium, can have some desirable processing advantages. This can offset the added expense of production. For example, such elevated conditions of temperature allows for the electrolysis to be carried out at significantly higher current density (based on total anode surface). As reported in this copending application, electrolysis for production of EMD carried out at such elevated temperature, preferably between 115° C. and 155° C. and superatmopsheric pressure allows higher current density of between 12.5 and 37 Amp/ft$^2$ (135 and 400 Amp/m$^2$) more preferably between 18 and 37 Amp/ft$^2$ (194 and 400 Amp/M$^2$) based on anode surface area, to be employed while avoiding passivation of the titanium anode which typically occurs at very high current densities, e.g. greater than about 10 to 11 Amp/ft$^2$ (108 and 119 Amp/m$^2$). Essentially, it has been determined that electrolysis at temperature between 115° C. and 155° C. eliminates the problem of passivation of a titanium anode. (Passivation occurs as an insulating oxide film builds up on the anode.) It has been discovered that when the electrolysis is conducted at elevated temperature above 115° C., e.g., between about 115° C. and 155° C. the problem of anode passivation of a titanium anode is essentially eliminated, even if the current densities are increased to a level between 12.5 and 37 Amp/ft$^2$ (135 and 400 Amp/m$^2$). Such benefit when coupled with attainment of a better performing manganese dioxide under such operating conditions, could easily offset any added expense incurred in such operation. Such better performing battery grade manganese dioxide is reported in the present application herein.

In any event because of the lack of activity or motivation, commercial producers have failed to recognize the interplay between BET surface area and micropore area as reported by Applicant herein in order to produce a superior battery grade manganese dioxide. The experimental evidence herein presented suggests that a preferred manganese dioxide having a BET surface between 20 and 31 m$^2$/g simultaneously with a micropore surface area of between 8 and 13 m$^2$/g in the context of total intraparticle porosity of between about 0.035 and 0.06 cm3/g, typically between about 0.035 and 0.05 cm$^3$/g, is obtainable. And it is more readily obtainable if the manganese dioxide is made during electrolysis conditions carried out at the above referenced elevated temperatures and superatmospheric pressure conditions.

Although the graphs and descriptions of the preferred porosimetric coordinates are presented here in terms of intraparticle porosity measured by the BJH (Barrett, Joyner and Halenda) desorption pore volume method, the micropore volume measured by the de Boer "t" method, the total surface area measured by the BET (Brunauer, Emmet, Teller) method and the micropore area measured by the de Boer "t" method, it will be appreciated by those skilled in the art and knowledgeable in porosimetry that many other possible experimental and theoretical means of describing porosity and surface area are possible. Each method and theory leads to somewhat different numerical values, but in all cases, for a given material, an equivalent set of limits can be established. Thus, it would be possible to develop parallel sets of values for intraparticle porosity, micropore volume, total surface area and micropore area using the MP (Mikhail, Brunauer and Bodor) method, the DH (Dollimore and Heal) method, the DR (Dubinin and Radushkevich) method, the DA (Dubinin and Astakhov) method, the HK (Horvath and Kawazoe) method or the SF (Saito-Foley) method.

There are also additional techniques for total surface area and micropore surface area, such as the DFT (density functional theory) method.

All of the preceding methods and theories are based on gas adsorption experiments. Other methods of measuring porosity also exist.

Pore volume for the larger meso-macropores (only) can be measured separately by mercury intrusion.

Additionally, total intraparticle pore volume can be measured by combining data from measurements of skeletal density (measured by various pycnometric methods such as helium, kerosene, or water pycnometry) with measurements of the so-called envelop density (measured by displacement of the unknown porous sample in a compressed solid medium such as silica or graphite powder).

Thus many possible combinations are possible, each giving a parallel set of preferred values for BET area and micropore area as a function of the total intraparticle porosity. No single set of porosimetry theories is inherently better than another. We have found that the BET method, the de Boer "t" method and BJH desorption pore volume are adequate to the task of defining the preferred values of these 3 parameters, but any other combination of porosimetric theories could equally well be used. In each case the absolute numerical values for the limits would be different but valid when measured by the appropriate method.

Accordingly, the invention is not intended to be limited to the specific examples, but rather its scope is reflected by the claims and equivalents thereof.

What is claimed is:

1. A manganese dioxide having micropores and meso-macropores, said manganese dioxide having simultaneously a BET surface area between about 20 and 31 m$^2$/g, a micropore area between about 8 and 13 m$^2$/g and an average meso-macro pore radius greater than 32 Angstom, wherein said manganese dioxide is in particulate form and said micropores and memo-macro pores are intraparticle pores and the total porosity of said manganese dioxide, based on pores within the manganese dioxide, is between 0.035 cm$^3$/g and 0.050 cm$^3$/g, wherein the micropores are defined as intraparticle pores having a diameter less than or equal to 20 Angstrom and the meso-macropores are intra particle pores having a diameter greater than 20 Angstrom.

2. The manganese dioxide of claim 1 wherein the manganese particles have an average diameter between about 1 and 100 micron.

3. The manganese dioxide of claim 1 wherein said manganese dioxide is an electrolytic manganese dioxide.

4. An electrolytic manganese dioxide product having micropores and meso-macropores, said manganese dioxide having simultaneously a BET surface area between about 20 and 28 $m^2/g$ and a micropore area between 8 and 13 $m^2/g$, and an average meso-macropore radius greater than about 32 Angstrom, with the total porosity, based on pores within the manganese dioxide, being between about 0.035 $cm^3/g$ and 0.040 $cm^3/g$, wherein the micropores are defined as pores within the manganese dioxide having a diameter less than or equal to 20 Angstrom and the meso-macropores are pores within the manganese dioxide having a diameter greater than 20 Angstrom.

5. The manganese dioxide of claim 4, wherein said manganese dioxide is in particulate form and said micropores and meso-macro pores are intraparticle pores.

6. The electrolytic manganese dioxide of claim 5 wherein the manganese dioxide product is in particulate form having an average particle diameter between about 1 and 100 micron.

7. An electrolytic manganese dioxide product having micropores and meso-macropores, said manganese dioxide having simultaneously a BET surface area between about 20 and 30 $m^2/g$ and a micropore area between 8 and 13 $m^2/g$, and an average meso-macropore radius greater than about 32 Angstrom, with the total porosity, based on pores within the manganese dioxide, being between about 0.040 $cm^3/g$ and 0.045 $cm^3/g$, wherein the micropores are defined as pores within the manganese dioxide having a diameter less than or equal to 20 Angstrom and the meso-macropores are pores within the manganese dioxide having a diameter greater than 20 Angstrom.

8. The manganese dioxide of claim 7 wherein the manganese dioxide is in particulate form and said micropores and meso-macro pores are intraparticle pores.

9. The electrolytic manganese dioxide of claim 8 wherein the manganese dioxide is in particulate form having an average particle diameter between about 1 and 100 micron.

10. An electrolytic manganese dioxide product having micropores and meso-macropores, said manganese dioxide having simultaneously a BET surface area between about 20 and 31 $m^2/g$ and a micropore area between 8 and 13 $m^2/g$, and an average meso-macropore radius greater than about 32 Angstrom, with the total porosity, based on pores within the manganese dioxide, being between about 0.045 $cm^3/g$ and 0.050 $cm^3/g$, wherein the micropores are pores within the manganese dioxide having a diameter less than ox equal to 20 Angstrom and the meso-macropores are pores within the manganese dioxide having a diameter greater than 20 Angstrom.

11. The manganese dioxide of claim 10 wherein the manganese dioxide is in particulate form and said micropores and meso-macro pores are intraparticle pores.

12. The electrolytic manganese dioxide of claim 11 wherein the manganese dioxide is in particulate form having an average particle diameter between about 1 and 100 micron.

* * * * *